H. B. GOLDSTEIN.
PORTABLE STOVE.
APPLICATION FILED MAY 18, 1920.
1,432,996.
Patented Oct. 24, 1922.
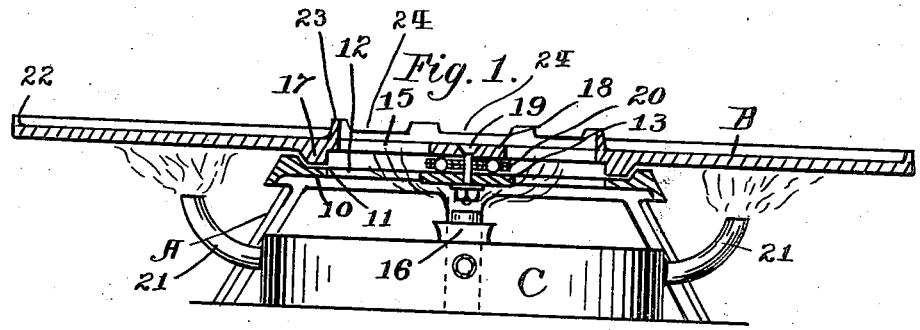
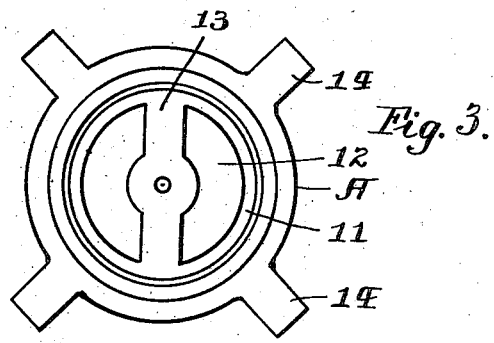
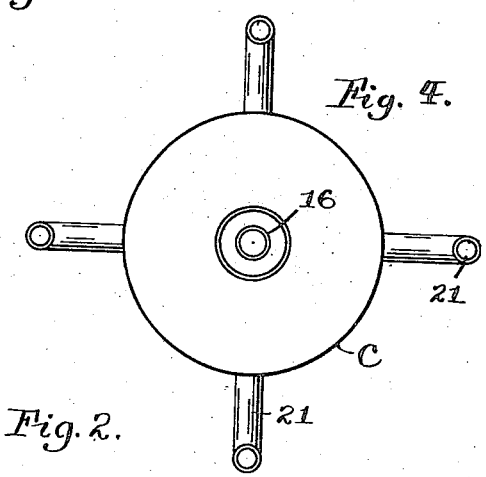
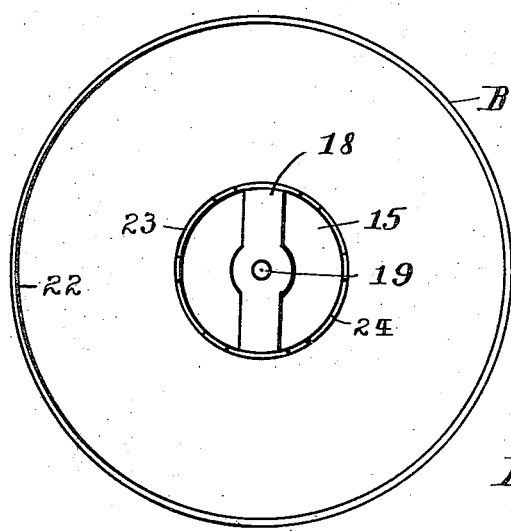
Inventor:
Harry B. Goldstein
by: Bradbury & Caswell
Attorneys.

Patented Oct. 24, 1922.

1,432,996

UNITED STATES PATENT OFFICE.

HARRY B. GOLDSTEIN, OF ST. PAUL, MINNESOTA.

PORTABLE STOVE.

Application filed May 18, 1920. Serial No. 382,304.

*To all whom it may concern:*

Be it known that I, HARRY B. GOLDSTEIN, a citizen of the United States, residing at St. Paul, in the county of Ramsey and State of Minnesota, have invented a new and useful Improvement in Portable Stoves, of which the following is a specification.

My invention relates to improvements in stoves, the primary object being to provide an easily portable stove, which facilitates the operation of cooking or any other use for which devices of this general character are adapted. More particularly this invention provides a rotatable hot plate upon which articles can be fried, toasted or cooked, said plate being easily moved into a position by turning, so that any portion of its surface is more readily accessible. This invention further provides said hot plate with an opening over which a receptacle or other object to be heated can be placed to come into direct contact with a heating flame from below, thereby more quickly and more directly heating said receptacle or other object. This invention also associates with said hot plate a heater having burners directly below said opening and directly below the outer portion of the plate, so that heat can be directly applied at will by the operator, either to the opening therethrough or to any outer portion to either directly or indirectly effect any desired portion of the plate. With these and other objects and advantages in view, my invention comprises the features of construction and combination of parts hereinafter described and claimed.

In the accompanying drawing forming part of this specification, Fig. 1 is a vertical central section of my invention, showing the parts thereof assembled for use; Fig. 2 is a top plan view of the hot plate; Fig. 3 is a top plan view of the stand, and Fig. 4 is a top plan view of the heating element.

In the drawing, A indicates a stand which resembles a spider frame being constructed with a horizontal body 10 having a circular recess 11, circular opening 12 and supporting bar 13 across said opening and with outwardly and downwardly slanting supporting legs 14.

Associated with this stand is a hot plate B, which resembles a dish having an opening 15 superimposed above the opening 12 and forming with opening 12 a draft passage up which heated air and gases from the flame of a burner 16 on a heater C are adapted to pass. This plate has a circular downwardly extending shoulder 17, which fits freely into the recess 11 and is formed with an integral bar 18 across the opening 15. The bars 13 and 14 are tied together by the bolt 19, which acts as a pivot, so that the hot plate may be revolved freely in a horizontal plane on the stand. An antifriction bearing 20 through which the bolt 19 also passes is interposed between the bars 13 and 18, so that the plate will more readily turn on its support. This bearing also serves as a spacing element to hold the plate with the annular shoulder 17 and its lower surface out of contact with the upper surface of the stand and its recess. Should the plate tilt however, the shoulder will bear upon the surface of the stand and limit the tilting movement.

The heating element C may be any suitable hydrocarbon or other form of heater. In practice I have found a heater which is supplied with alcohol fuel, safe and effective. This heater is placed in the stand and is provided with centrally disposed burners 16 below the draft passage formed by openings 12 and 15. Thus when a receptacle or other object is placed in the path of said draft passage and on the plate, it is in direct contact with the heated air and gases from burners 16. The heater is also provided with outwardly and upwardly extending burners 21, which project through the stand and provide a source of heat directly below the outer portion of the hot plate. As many burners 21 may be employed as desired to concentrate heat on any part of the hot plate. If only one outer burner 21 is used heat will be applied to one particular zone on the plate, the balance of the plate being only indirectly heated. This is advantageous for some kinds of cooking, baking or frying when not too hot a cooking surface is desired. By turning the plate the application of the heat from a single burner 21 may be modified and regulated. During the cooking operation, the hot plate may also be turned to facilitate the manipulation of objects on the surface of the hot plate. The hot plate has upwardly projecting marginal outer and inner flanges 22 and 23, which serve to hold cooking material on the plate, the inner flange being formed with spaces 24 through which the heated gases of the burner flame may pass freely when a cooking utensil is placed and supported by the inner flange.

Having described my invention what I claim as new and desire to protect by Letters Patent is:

1. A stove, comprising, in combination, a frame stand having a body formed with a circular opening upwardly therethrough, a hot plate journaled to revolve horizontally on said stand and having a circular opening in constant axial alignment with the opening in said stand, said hot plate being formed with spaced utensil supports at the margin of the opening therein, and a heating element having a burner directly beneath said openings.

2. A stove, comprising, in combination, a spider frame stand having a body formed with a circular opening upwardly therethrough, a hot plate journaled to revolve in substantially a horizontal plane and having a circular opening in constant axial alignment with the opening in said stand, and a heating element having a burner below said openings for the purposes specified.

3. A stove, comprising, in combination, a spider frame stand having a body formed with a circular opening upwardly therethrough, a hot plate journaled centrally to revolve in substantially a horizontal plane and having a central, circular opening in constant axial alignment with the opening in said stand, and a heating element having a burner below said opening and a burner extending outwardly to a position below the outer portion of said plate to directly affect said outer portion.

In testimony whereof, I have signed my name to this specification.

HARRY B. GOLDSTEIN.